Oct. 26, 1965  E. L. PETRUZZI  3,213,511
CEMENT BLOCK MACHINE
Filed April 10, 1962  2 Sheets-Sheet 1
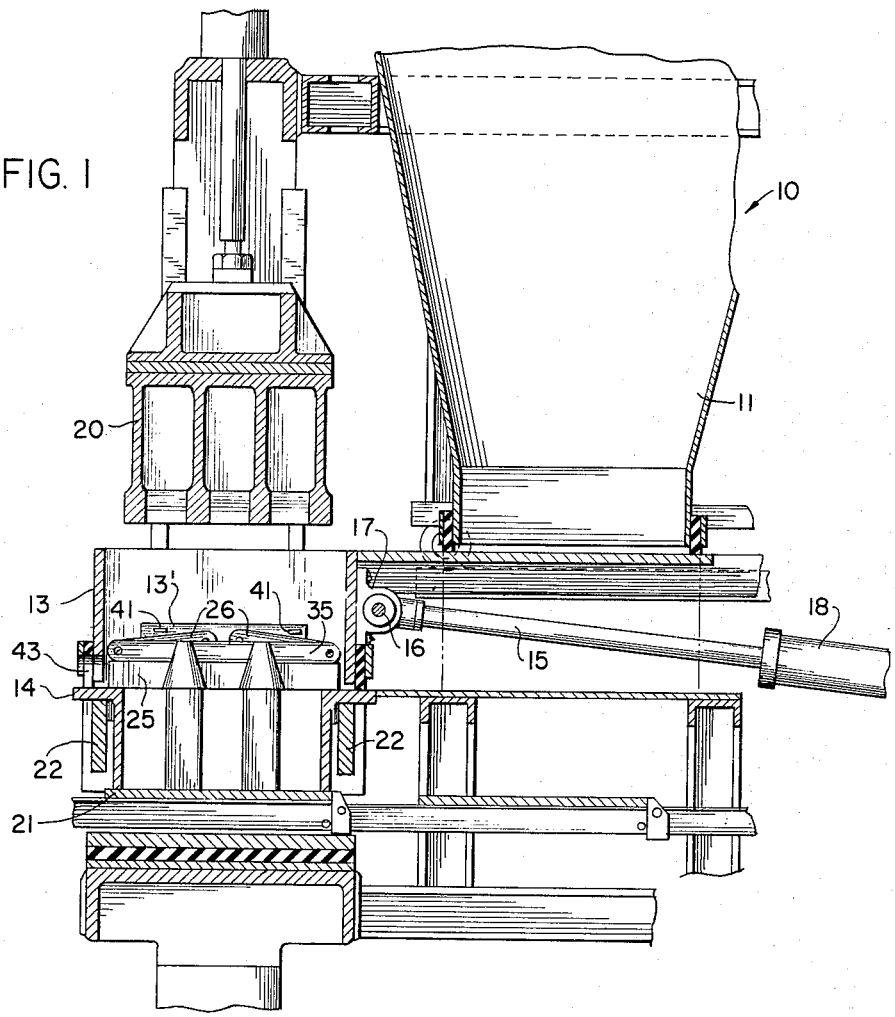
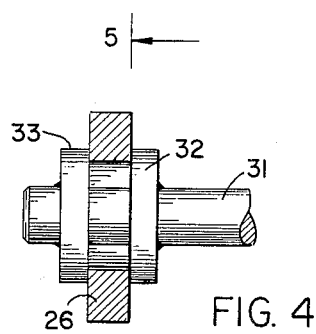
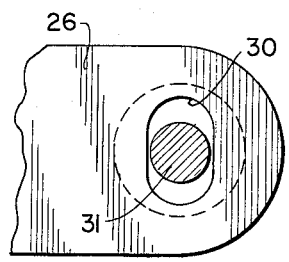
INVENTOR
E. L. PETRUZZI
BY
ATTORNEY

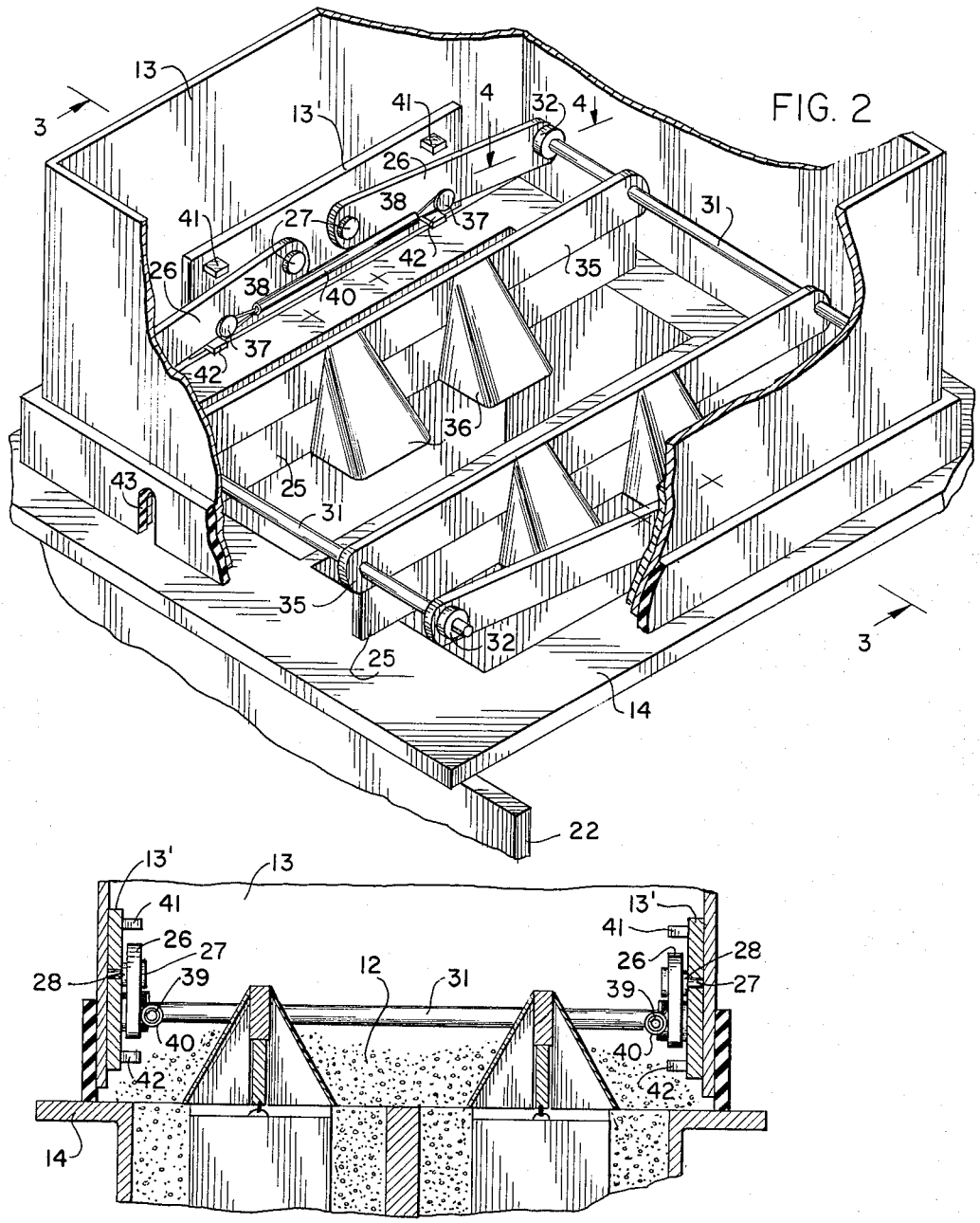

United States Patent Office 3,213,511
Patented Oct. 26, 1965

3,213,511
CEMENT BLOCK MACHINE
Eldred L. Petruzzi, Lakeland, Fla., assignor to S. & S. Manufacturing Co., Lakeland, Fla., a corporation of Florida
Filed Apr. 10, 1962, Ser. No. 186,559
7 Claims. (Cl. 25—41)

This invention relates to the fabrication of buildings of various kinds, to the elements employed in the creation of the foundation and other parts thereof, and to equipment by which such elements may be produced.

The invention relates particularly to building blocks of concrete or other plastic composition, to their manufacture or production and to equipment by which they may be fabricated most satisfactorily and efficiently.

Machines have been produced for the manufacture of masonry blocks utilizing vibratory means in the production of the same in order to cause settling and the avoidance of flaws in the blocks.

Multiple vibrating means has been utilized for the molds and the devices from which the material was delivered from a hopper or source of supply to the mold. It has only been necessary that the delivery device be vibrated during the discharge of the material from the feed drawer into the mold to facilitate such discharge and to cause more even distribution of the material in the mold. Structures heretofore employed have been massive, complicated, difficult to operate, expensive, and otherwise subject to objection.

It is an object of the invention to reduce the vibratory means by omitting the same on the delivery mechanism and by placing such delivery mechanism in such relation that vibrations from the mold can be transmitted to the delivery mechanism.

Another object of the invention is to provide means for maintaining intimate contact between the delivery mechanism and the mold when the material is being transmitted from one to the other and to provide a material grate for the delivery mechanism of a cement block machine which may be operated from another portion of such a machine.

Other objects and advantages of the invention will be apparent from the following description taken in conjunction with the accompanying drawings wherein:

FIG. 1 is a vertical section through a cement block machine illustrating one application of the present invention;

FIG. 2, an enlarged perspective of the feed drawer of the machine of FIG. 1;

FIG. 3, a section on the line 3—3 of FIG. 2;

FIG. 4, an enlarged section on the line 4—4 of FIG. 2; and

FIG. 5, a section on the line 5—5 of FIG. 4.

Briefly stated, the invention is directed primarily to the provision of a hopper and a mold with delivery mechanism for the transferring material of which masonry blocks or other structures are to be formed from the upper to the mold and with vibrating means for the mold and the hopper in contact or in vibration transfer relation with the delivery or transfer mechanism to produce transfer of the latter to insure complete discharge therefrom.

With continued reference to the drawings, there is provided a machine 10 for producing blocks or other building material of cement or masonry, such articles having a gravity discharge hopper 11 into which a semi-plastic molding material 12 such as cement is introduced.

The material 12 is discharged from the bottom of the hopper 11 into a feed drawer or delivery mechanism 13 which is then moved longitudinally to a position overlying a mold 14 to dispense or discharge the material into such mold. The feed drawer or delivery mechanism may be reciprocated between the hopper and the mold in any conventional manner as by a piston rod 15 pivotally connected by a pin 16 to a mounting block 17 attached to the drawer or delivery mechanism 13 and such piston rod extended into an hydraulic cylinder 18.

After the material has been discharged into the mold, the feed drawer or delivery mechanism is retracted or returned to a position beneath the hopper and to be refilled. Simultaneously a presser 20 is utilized to apply pressure to the material in the mold box after which the mold box is stripped from the formed block and the pallet or support 21 on which the block rests is removed from the machine.

In order to assist in the discharge of material from the feed drawer or delivery mechanism 13 into the mold 14 and to insure the complete filling thereof, the mold 14 is supported on a frame 22 to which a vibratory motion is imparted by an eccentric operated by an electric motor of conventional character (not shown).

Instead of providing a separate means for vibrating the feed drawer 13, the present invention contemplates the transmitting of vibration from the mold 14 to the feed drawer 13 while such units are in overlying cooperative relation. This is accomplished by providing core bars 25 welded or otherwise attached to the top of the mold 14 and moving a portion of the feed drawer 13 into intimate contact with such core bars.

The feed drawer 13 is provided with a material grate adapted to engage the core bars 25 of the mold in order to receive vibrations therefrom.

Such material grate includes a pair of anchor links 26 pivotally mounted at one end by pins 27 to a plate 13' welded or otherwise attached to each side of the feed drawer 13 and the anchor links 26 are maintained in spaced relation to the plate 13' by spacers 28. The outer ends of the links 26 are provided with slots 30 in which connecting bars 31 are adjustably received. The bars 31 have a pair of positioning collars 32 and 33 adjacent each end with one of such collars disposed on each side of the anchor links 26. The collars 32 and 33 are welded or otherwise attached to the bars 31 in a manner to permit such bars to move freely within the slots 30 of the links 26.

The bars 31 receive a plurality of vibration transmitting cross members 35 intermediate the ends thereof and such members are maintained in contact with the core bars 25. A plurality of tapered filling members or cones 36 are fixed to each of the cross members 35 to transmit vibrations from such members to the molding material 12 carried within the feed drawer 13. Although two cones have been illustrated on each cross member 35, it is noted that the number, size and shape of the cones is determined by the type of mold used.

In order to maintain the cross members 35 in intimate contact with the core bars 25, the links 26 on each side of the feed drawer are provided with outwardly projecting pins 37 connected by hooks 38 on each end of a coiled tension spring 39. Such spring is preferably encased within a covering 40 to prevent material from being lodged between the coils thereof. The tension of the spring tends to urge the links 26 downwardly about the pivots 27 to cause the members 35 to remain in contact with the core bars 25 so that when the mold is vibrated, such vibration will be transmitted through the core bars to the members 35 and the cones 36 attached thereto and then to the material within the feed drawer to cause such material to be discharged into the mold box. The plate 13' at each side of the feed drawer 13 is provided with upper and lower stops 41 and 42 which project inwardly to limit the rotation of the anchor links 26 in both directions.

The feed drawer 13 is provided with openings 43 in the front wall thereof to permit the feed drawer to be retracted over the core bars 25 when the drawer is retracted to a position beneath the hopper 11. When the drawer is thus retracted, the anchor links 26 will be urged downwardly into contact with the lower stops 42 by the tension of the spring 39.

In the operation of the device, material is discharged from the hopper 11 into the feed drawer 13 whereupon the feed drawer is advanced by the piston rod 15 and hydraulic cylinder 18 to a position overlying the mold box 14. The mold box, which is vibrating rapidly, is provided with a plurality of core bars 25, the top of which slidably receives cross members 35 and transmits the vibration of the mold box to such members. Such cross members in turn transmit the vibrations to the material within the feed drawer to assist in the discharging of the material from the drawer into the mold box. When the material has been discharged from the feed drawer, the drawer is retracted to a position beneath the hopper, at which time the material grate within the feed drawer is no longer in contact with the core bars 25 and is therefore not vibrating.

It will be apparent that a relatively simple material grate is provided for a feed drawer in such a manner that a vibratory motion can be imparted to the material grate and to the material within such drawer at specified intervals of the cycle of the drawer when such vibration is needed. This vibration can be imparted to the material grate by structure mounted on the mold box and without a separate vibrating system for the feed drawer.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A concrete block machine having a hopper, feed mechanism and a mold,
    (A) said mold including
        (1) a frame for vibrating said mold,
        (2) a plurality of core bars mounted on said mold,
        (3) means for vibrating said frame,
    (B) said feed mechanism including a feed drawer,
        (1) pairs of anchor links pivotally attached to opposite sides of said feed drawer,
        (2) connecting rods connecting the outer ends of one pair of anchor links with the outer ends of the other pair of anchor links,
            (a) means adjustably connecting said connecting rods to said anchor links,
        (3) a plurality of vibration transmitting members spaced along said connecting rods,
        (4) each vibration transmitting member having multiple cones attached thereto,
        (5) said feed mechanism having openings in one wall to permit said core bars to pass therethrough,
    (C) said vibration transmitting members slidably mounted on said core bars for receiving vibrations therefrom,
    (D) spring means connecting each pair of anchor links for maintaining said vibration transmitting members in intimate contact with said core bars whereby vibration of said mold by said frame will be transmitted to said feed mechanism for causing discharge of material therefrom into said mold.

2. A block making machine comprising hopper means for containing a mass of moldable material, a feed drawer for receiving material from said hopper means, a mold spaced from said hopper means, a plurality of core bars mounted on said mold, means for moving said feed drawer and the material therein from said hopper means to said mold, a material grate carried within said feed drawer, said grate including a plurality of vibration transmitting members slidably engageable with said core bars, spring means urging said vibration transmitting members into contact with said core bars, means for producing vibration of said mold and said core bars, whereby vibrations of said mold will be transmitted to said material grate for causing discharge of material from said feed drawer to said mold.

3. The structure of claim 2 in which said grate includes anchor links pivotally attached to opposite sides of said feed drawer, rods connecting a pair of anchor links on opposite sides of said drawer, said rods being carried by said vibration transmitting members.

4. The structure of claim 3 including a pair of oppositely disposed anchor links located at each side of said feed drawer, and spring means connecting each pair of anchor links for maintaining said vibration transmitting members in intimate contact with said core bars.

5. In combination with a feed drawer for supplying a plastic mixture to a mold, a material grate pivotally mounted on said feed drawer and comprising pairs of anchor links pivotally mounted to opposite sides of said feed drawer, means for connecting the free ends of one pair of links with the free ends of the other pair of links, at least one vibration transmitting member mounted on said connecting means, means for vibrating said mold, and means for moving vibration transmitting means into intimate contact with said mold.

6. A block making machine comprising a mold member, at least one core bar on said mold member, a moldable material feed drawer selectively disposable over said mold member, a grate member movably mounted in said feed drawer, spring means urging a portion of said grate member into contact with said core bar, and means for vibrating one of said members, whereby vibrations from said one member will be transmitted through said core bar to the other member to cause the material in said feed drawer to be discharged into said mold.

7. A block making machine comprising a mold member, a slidably mounted feed drawer selectively disposable over said mold member, grate means movably mounted in said feed drawer, said grate means including at least one vibratable member, spring means urging said vibratable member into contact with said mold member, and means for vibrating said mold member, whereby vibrations of said mold member will be transmitted to said grate means for causing the discharge of material from said feed drawer to said mold member.

References Cited by the Examiner

UNITED STATES PATENTS

| | | | |
|---|---|---|---|
| 1,777,660 | 10/30 | Dahl | 25—103 XR |
| 2,091,385 | 8/37 | Trickey | 25—41 XR |
| 2,165,671 | 7/39 | Ward | 25—41 XR |
| 2,322,169 | 6/43 | Smith | 141—72 |
| 2,396,999 | 3/46 | George | 25—41 XR |
| 2,524,359 | 10/50 | Romie | 25—41 |
| 2,584,444 | 2/52 | Grueneberg | 25—103 |
| 2,620,540 | 12/52 | Weir | 25—41 XR |
| 2,686,950 | 8/54 | Zevely | 25—41 XR |
| 2,839,810 | 6/58 | Kovach | 25—103 |
| 2,842,827 | 7/58 | Nickelson | 25—103 |

WILLIAM J. STEPHENSON, *Primary Examiner.*

ROBERT F. WHITE, MICHAEL V. BRINDISI,
*Examiners.*